United States Patent
Blake et al.

(10) Patent No.: US 8,027,992 B2
(45) Date of Patent: Sep. 27, 2011

(54) BUILD AUTOMATION AND VERIFICATION FOR MODULAR SERVERS

(75) Inventors: David Blake, Austin, TX (US); Michelle Eddie, Austin, TX (US)

(73) Assignee: Dell Products L.P., Round Rock, TX (US)

(*) Notice: Subject to any disclaimer, the term of this patent is extended or adjusted under 35 U.S.C. 154(b) by 407 days.

(21) Appl. No.: 12/055,545

(22) Filed: Mar. 26, 2008

(65) Prior Publication Data

US 2008/0177711 A1    Jul. 24, 2008

Related U.S. Application Data

(62) Division of application No. 10/682,621, filed on Oct. 9, 2003, now Pat. No. 7,360,212.

(51) Int. Cl.
    G06F 17/30    (2006.01)
    G06F 7/00     (2006.01)

(52) U.S. Cl. ......... 707/769; 707/761; 707/812; 707/966

(58) Field of Classification Search ............ None
    See application file for complete search history.

(56) References Cited

U.S. PATENT DOCUMENTS

| | | | | |
|---|---|---|---|---|
| 5,848,202 | A | 12/1998 | D'Eri et al. | 382/306 |
| 5,963,743 | A * | 10/1999 | Amberg et al. | 717/174 |
| 6,279,155 | B1 | 8/2001 | Amberg et al. | 707/11 |
| 6,279,156 | B1 | 8/2001 | Amberg et al. | 717/11 |
| 6,389,414 | B1 * | 5/2002 | Delo et al. | 1/1 |
| 6,499,115 | B1 * | 12/2002 | Wiedeman et al. | 714/30 |
| 6,560,776 | B1 * | 5/2003 | Breggin et al. | 717/176 |
| 6,804,663 | B1 * | 10/2004 | Delo | 1/1 |
| 7,093,756 | B2 * | 8/2006 | Muehl et al. | 235/451 |
| 7,213,026 | B2 * | 5/2007 | Evans et a | 1/1 |
| 7,245,632 | B2 * | 7/2007 | Heffernan et al. | 370/465 |
| 7,297,062 | B2 * | 11/2007 | Gatto et al. | 463/42 |
| 7,765,347 | B2 * | 7/2010 | King et al. | 710/100 |
| 2002/0100036 | A1 * | 7/2002 | Moshir et al. | 717/173 |

* cited by examiner

*Primary Examiner* — Greta Robinson
*Assistant Examiner* — James J Wilcox
(74) *Attorney, Agent, or Firm* — Baker Botts L.L.P.

(57) ABSTRACT

A system and method for managing and verifying the installation of software on a modular information handling system includes a bar file database and an installation management module. The bar file database stores bar files. The bar files each are related to a component of a modular information handling system. The installation management module is able to receive a bar file and communicate with the bar file database to identify and access each bar file associated with the modular information handling system.

19 Claims, 4 Drawing Sheets

BUILD AUTOMATION AND VERIFICATION FOR MODULAR SERVERS

RELATED APPLICATION

This application is a Divisional of U.S. application Ser. No. 10/682,621, filed Oct. 9, 2003 now U.S. Pat. No. 7,360,212. The contents of this application is incorporated herein in it's entirety by this reference.

TECHNICAL FIELD

The present disclosure relates in general to the field of computer systems and more specifically to a system and method for managing and verifying the installation of software and execution of hardware diagnostics onto a modular information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Customers ordering information handling systems often require that information handling systems arrive with pre-installed software. Such software often allows the information handling systems to be compatible with a customer's existing computers, programs and network.

Software is typically installed on the information handling system at the factory before it is shipped to the customer. Software installation typically includes three phases. First, an image is created that includes all of the hardware diagnosis instructions and software installation instructions for a particular information handling system. Second, the software is installed on the information handling system. This is also known as the "burn" phase. Third, the information handling system is checked to verify that all of the software was correctly installed.

One type of information handling system is a modular information handling system such as a multi-blade server. Multi-blade servers typically include midplanes for attaching multiple blades (sometimes referred to as "bricks"). Midplanes allow the multiple blades to be interconnected in a single chassis and to share a common power source. Each blade typically includes a processor and memory and may store data, process information, or perform particular tasks.

Because each blade may function as an independent entity, a server may include blades that each perform different tasks. The varied tasks of each blade typically require different software applications to be installed on each blade. Therefore, a modular information handling system such as a blade server with multiple blades present particular challenges in efficiently and reliably managing and verifying the installation of software applications onto each blade.

Existing methods for managing and verifying the installation of software onto modular information handling systems involved manually scanning bar codes for each blade. Such systems are inefficient as they require operator involvement for managing and verifying the installation of software onto each blade. Although current verification process may determine that software has been installed on a particular component, these systems cannot efficiently determine that the entire modular information handling system has been successfully installed with software. Having to manually verify that all of the components of a modular information handling system have been properly installed increases the overall amount of time and operator involvement necessary to verify the installation of software on a modular information handling system.

SUMMARY

Therefore, a need has arisen for an improved system and method for managing and verifying the installation of software onto a modular information system.

A further need has arisen for a system and method for reducing operator involvement in installing software on a modular information handling system.

A further need exists for a system and method for verifying the installation of software onto a modular information handling system that recognizes the installation requirements of multiple modular components in a modular information handling system.

In accordance with teachings of the present disclosure, a system and method are described for managing and verifying the installation of software onto a modular information handling system that substantially reduces disadvantages and problems associated with previously developed systems and methods of managing and verifying the installation of software onto a modular information handling system. A system for managing the installation of software on a modular information handling system includes a bar file database able to store bar files and an installation management module able to receive a bar code and to identify and access each bar file related to the modular information handling system.

In one aspect, a system for managing the installation of software on a modular information handling system includes a bar file database and an installation management module. The bar file database stores bar files. Each bar file has a bar code and represents a component of a modular information handling system. The installation management module communicates with the bar file database. The installation management module is also able to receive a bar code of a component of a particular modular information handling system. The installation management module is further able to identify and access each bar file associated with the particular modular information handling system.

In another aspect, a method for installation of software onto modular information handling systems includes providing a bar code related to a component of a modular information handling system to an installation management module. The method further includes identifying each bar file related to the modular information handling system. The method then includes generating a list of installation tasks associated with the identified bar files and managing the installation of software on the modular components of the modular information handling system using the generated list.

In another aspect of the present disclosure, a system for verifying the installation of software applications onto a modular information handling system includes a software validation module that communicates with at least one real-time process database. The software validation module verifies that each selected software installation requirement for a particular modular information handling system has been successfully completed. The software validation module also queries at least one software installation database to determine whether each software installation requirement has been satisfied.

The present disclosure includes a number of important technical advantages. One technical advantage of the present disclosure includes providing an installation management module that facilitates the installation of software onto a modular information handling system by communicating with a bar file database to identify and access each bar file associated with the modular information handling system. The installation management module advantageously reduces operator involvement in the software installation process. Another important technical advantage of certain embodiments of the present disclosure includes providing a software validation module that recognizes the installation requirements for each component on a modular information handling system. This advantageously reduces the time required to verify that software requirements for the modular information handling system have been satisfied.

All, some or none of these technical advantages may be present in various embodiments of the present disclosure and other technical advantages will be readily apparent to those skilled in the art from the following FIGURES, descriptions and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

An information handling system may also include a modular information handling system such as a blade server with multiple blades. Multi-blade servers may perform a variety of tasks including storing data or programs, running administrative software and providing resources to workstations on a network. Multi-blade servers typically include midplanes for attaching multiple blades (sometimes referred to as "bricks"). Midplanes allow the multiple blades to be interconnected in a single chassis and to share a common power source. Each blade typically includes a processor and memory and may store data, process information, or perform particular tasks.

Figure 1:
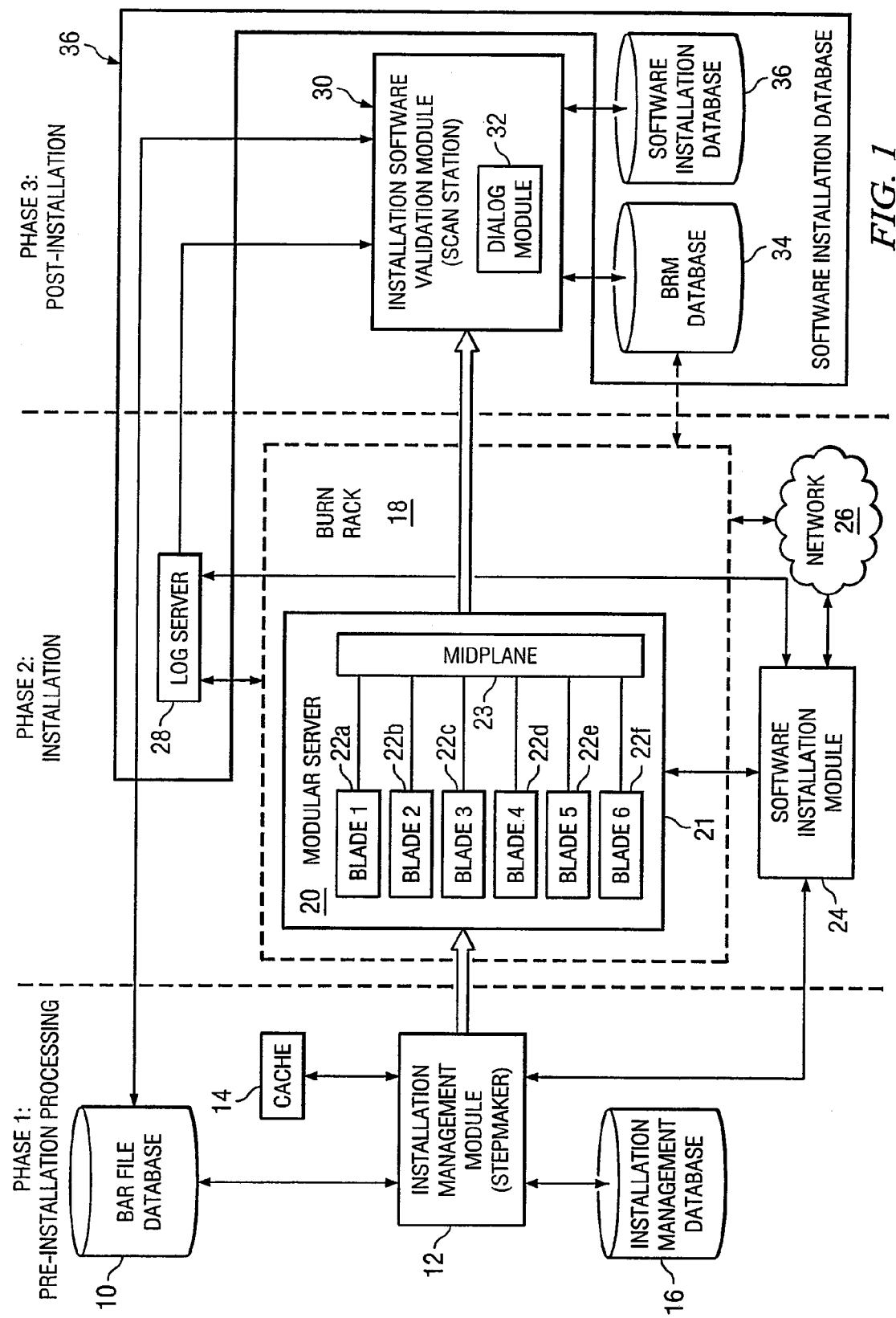
FIG. 1 illustrates a diagram of a modular information handling system associated with an installation management module and an installation software validation module according to teachings of the present disclosure.

FIG. 1 illustrates a block diagram of a modular information handling system 20 associated with an installation management module 12 and an installation software validation module 30 according to teachings of the present disclosure. FIG. 1 generally depicts the three phases that occur during the installation of software onto a modular information handling system. The three phases include the pre-installation processing phase, the installation phase and the post-installation phase. The installation of software onto modular information handling system 20, in the present embodiment, referred to also as modular server 20, begins with the pre-installation processing phase.

The pre-installation processing phase starts when an order is placed for modular server 20. The order generates an order number and a so-called bar file for each modular component within modular information handling system 20. The order number is associated with modular server 20 and is generated when an order for modular server 20 is initially placed. Bar files contain an inventory of manufacturing information needed to complete the customer order. Each bar file contains product and order information regarding its associated modular component (such as a blade 22 or chassis 21 of modular server 20) being manufactured.

As described in greater detail with respect to FIG. 4, below, bar file database 10 stores bar files 60 associated with modular server 20. Bar file database 10 is associated with installation management module 12 and installation software validation module 30. Bar file database 10 may be used to store bar files for a large number of modular information handling systems, including all of the bar files associated with modular server 20. In one embodiment, bar file database 10 may be a distributed production control system (DPCS) database.

Installation management module 12 manages the installation of software onto modular server 20. In one particular preferred embodiment, installation management module 12 may also be referred to as a "stepmaker module" or simply as "stepmaker." Installation management module 12 is also associated with modular server 20, bar file database 10, cache 14, installation management database 16 and software installation module 24.

In operation, installation management module 12 may begin by receiving a bar code associated with modular server 20. A bar code is an identifier associated with a particular bar file. Each bar file includes the list of components and software necessary to build the associated modular component such as chassis 21 and blades 22a, 22b, 22c, 22d, 22e and 22f. In the present embodiment, each modular component is preferably assigned a unique identifier such as a bar code. Once installation management module 12 receives a single bar code, it communicates with bar file database 10 to identify and access each bar file associated with the selected modular server 20. For example, given the bar code of blade 22a, bar file database 10 may identify the bar file associated with blade 22a and the bar files related to modular server 20, namely the bar file of chassis 21 and bar files of blades 22b-f. Through the use of bar file database 10, the bar code of chassis 21 is preferably used to access installation specifications including required software applications and hardware diagnostics, concerning all blades 22a-f in chassis 21. Also included in the bar file are software download requirements for each blade 22a-f.

Upon receiving bar file information, installation management module 12 may utilize cache 14 to store bar file information. Cache 14 is associated with installation management module 12 and is operable to temporarily store bar file information. In a preferred embodiment Cache 14 is a RAM associated with installation management module 12. In an alternate embodiment cache may be any suitable cache memory.

Once installation management module 12 acquires bar file information for all components of a selected modular server 20, installation management module 12 may communicate with installation management database 16 in order to retrieve specific installation instructions. Installation management database 16 stores installation tasks associated with the software installation requirements listed in the bar files. Installation tasks may include instructions to run the appropriate hardware diagnostics on a particular blade and software installation instructions for a particular blade. Installation management database 16 may also store bar codes of bar files communicated from installation management module 12. Installation management database 16 provides installations tasks for each bar file. Installation management module 12 then generates an installation file listing each installation task required to validate hardware and/or install the selected software onto each modular component of modular server 20. The installation file may be referred to as a step file. A step file may also refer to a single installation task. Installation management module 12 may store the installation file in cache 14. Installation management module 12 communicates the installation file to software installation module 24 and then the software installation process enters phase 2.

The second phase of the installation process includes the installation of software and execution of hardware diagnostics onto modular server 20. This second phase further includes burn rack 18, modular server 20, software installation module 24, network 26 and log server 28. Burn rack 18 holds modular server 20 and includes installation resources for installation of software onto modular server 20.

Modular server 20 includes midplane 23, blades 22a-f, and chassis 21. In the present embodiment, midplane 23 is a circuit board that interfaces with blades 22a-f. Midplane 23 may provide power and management resources to blades 22a-f.

Although midplane 23 includes six blades 22a-f, midplane 23 may include more or less than six blades 22a-f. Midplane 23 does not require all six blades 22a-f for proper functionality—one server blade 22a installed on midplane 23 is sufficient for proper functionality of both midplane 23 and modular server 20. In some preferred embodiments, midplane 23 includes at least one blade 22a. In alternate embodiments, additional blades (such as blade 22b) may also be associated with midplane 23.

Blades 22a-f are connected to midplane 23. In the present embodiment, each blade 22a-f is preferably an independent server able to act independently of the other blades 22a-f. In preferred embodiment blades 22a-f are thin, ultra-dense, modular electronic circuit board containing one or more processors. Blades 22a-f may also include network functionality and storage capabilities. Blades 22a-f receive and send data through midplane 23.

During the final manufacturing stages of modular server 20, midplane 23 and blades 22a-f are fully assembled within chassis 21 of modular server 20. Chassis 21 is a housing that contains all the components of modular server 20. Although not expressly shown, modular server 20 may also include such components as a power source, connectors for management cards and a network interface card (NIC).

Software installation module 24 manages the installation of software onto modular server 20. Software installation module 24 is associated with installation management module 12, modular server 20, network 26 and log server 28. Software installation module 24 receives a software installation file from installation management module 12. Software installation module 24 performs the required installation tasks of the installation file on modular server 20. Software installation module 24 may perform hardware diagnostics on modular server 20. Software installation module 24 may then install software applications onto modular server 20. In one embodiment, software installation module 24 retrieves software applications from associated network 26.

Network 26 functions as a storage network for software applications to be installed onto modular information handling systems such as modular server 20. Network 26 may store software applications on one or more local area networks (LANs) that may preferably be configured using management software so the LANs can communicate as if they were attached to a single LAN line, when in fact they may be located on a number of different LAN segments. Therefore network 26 may incorporate a variety of networks. In one embodiment, network 26 may contain proprietary, customer specific software applications. For instance, part of network 26 may be associated with a distinct customer and may have restricted access to securely stored software applications that are proprietary to that customer. In another embodiment, network 26 may include factory-default networks that store software applications that are not proprietary to a specific customer (and may be generally accessed).

Software installation module 24 may access network 26 to obtain software applications for hardware diagnostics and software installations onto modular server 20. Network 26 preferably contains proprietary and non-proprietary software applications. As software installation module 24 diagnoses hardware and installs software, flag files are generated that record that hardware has been diagnosed and software has been installed. Log server 28 stores information, such as the installation of software onto modular server 20, including flag files.

After all necessary hardware has been validated and all software has been installed, modular server 20 moves to phase three, also referred to herein as the post-installation verification stage. In phase three, the installation software validation module 30 verifies that all appropriate hardware has been diagnosed and all software has been properly installed on modular server 20. Phase three generally incorporates bar file database 10, installation software validation module 30, log server 28, a software installation database, for example BRM database 34 and an additional generic software installation database 36.

Installation software validation module 30 is associated with bar file database 10, log server 28 and at least one software installation database generally depicted at 36.

Installation software validation module 30 verifies the diagnosis of hardware and installation of one or more selected software applications onto modular server 20. Installation software validation module 30 may verify that all hardware diagnostics have been run and all software applications have been installed by communicating with at least one software installation database 36.

Installation software validation module 30 receives a listing of selected software installation status associated with a modular server 20. For the purposes of this disclosure, software installation requirements may include hardware diagnosis applications and software applications. Installation software validation module 30 may receive software installation requirements from bar file database 10. Installation software validation module 30 then queries the at least one software installation database 36 to determine whether each software installation requirement has been satisfied. In one embodiment, installation software validation module 30 searches log server 28 for flag files corresponding to completed software installation operations.

Installation software validation module 30 may include dialogue module 32 that generates a response dialogue. Response dialogue provides post-installation process information to the operator. Examples of sample responses dialogue screens of dialogue module 32 are represented below in FIGS. 2 and 3.

In one embodiment, installation software validation module 30 may also determine whether the information handling system under test is a modular information handling system. This enables the software verification system to be functional for both modular and non-modular information handling systems.

Installation software validation module 30 is associated with a generic software installation database 36 and a specific software installation database, burn rack monitor (BRM) database 34. Other possible databases that installation software validation module 30 may be associated with includes a distributed production control system (DPCS) database, a quality management database software (QMDS) log, and a pre-boot execution environment (PXE) log. These databases are associated with both the installation phase and post installation phase of the software installation process. The databases receive and store flag files indicating completed hardware diagnosis and software installed on modular server 20. In another embodiment, software installation database 36 further includes log server 28.

In a particular embodiment, the system for verifying the installation of a plurality of selected software applications on a selected modular server 20 includes a DPCS database and log server 28. Installation software validation module 30 queries the DPCS database to determine whether a particular component of modular server 20 has completed the steps required for installation and queries at least one log server 28 or other database if the DPCS database fails to indicate installation completion.

In one embodiment, installation software validation module 30 may check at least one software installation database 36. In addition to log server 28, other databases, such as BRM database 34 and software installation database 36, may store flag files associated with the diagnosis of hardware and installation of software onto modular server 20.

Figure 2:
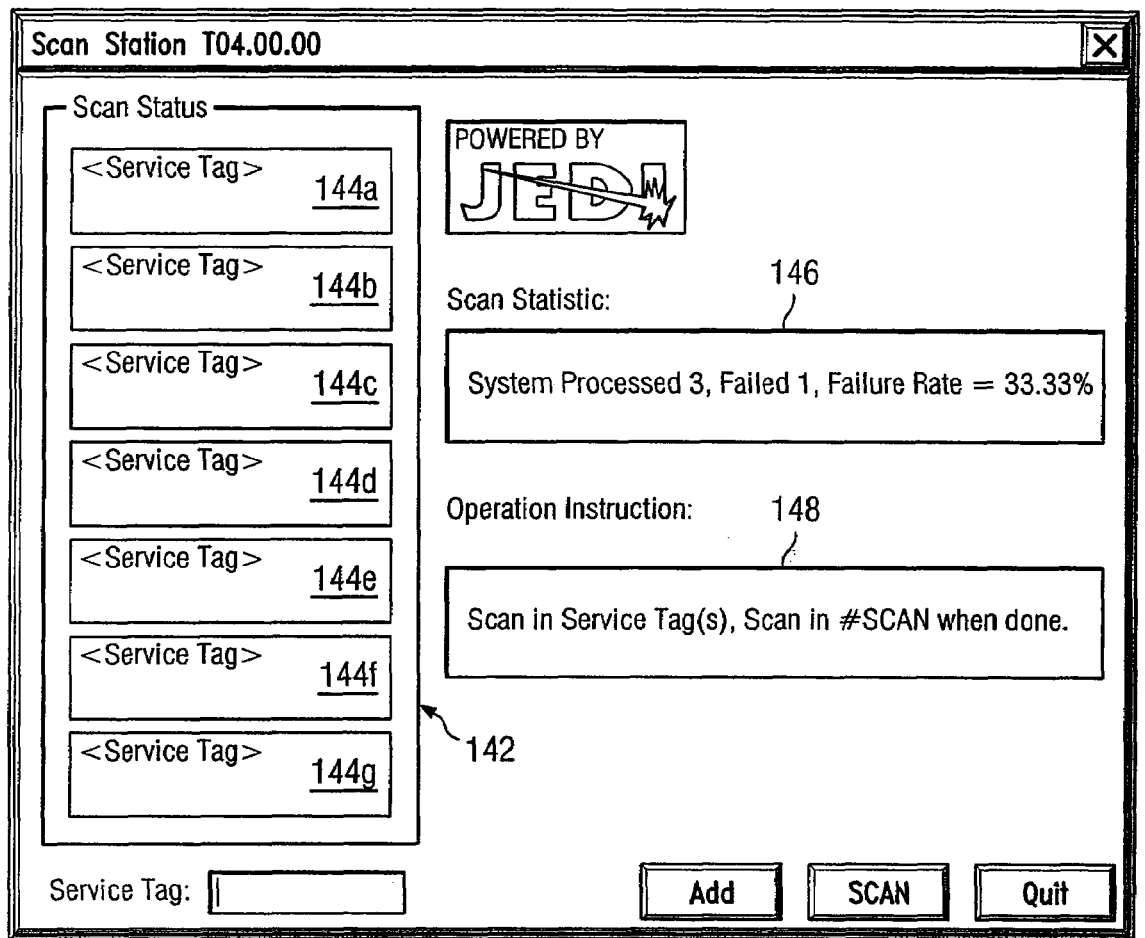
FIG. 2 illustrates an example response dialogue screen including information generated by the installation software validation module according to the teachings of the present invention.

FIG. 2 illustrates response dialogue screen 140 that an operator of installation software validation module 30 (Scan Station) may view. Response dialogue screen 140 includes scan status ox 142, statistic box 146 and instruction box 148. Scan status box 142 allows for seven entries 144a-g for scanned bar codes. In this embodiment, the bar code is referred to as a "Service Tag", but a bar code may also be referred to as bar code, track code or tag. In this example, no bar codes or service tags have been scanned into installation software validation module 30.

The right side of the response dialogue screen 140 displays statistic box 146 and instruction box 148. In the illustrated embodiment, statistic box 146 displays a statistical analysis of scanned information handling systems. In one embodiment, a statistical analysis is done per factory shift. Here a hypothetical statistic shows three servers processed with one server having failed.

Instruction box 148 displays operational instructions. For example, illustrated is a command for the operator to "Scan in Service Tag(s)." This box may also be used to highlight problems with the validation process such as an unreadable bar code.

Figure 3:
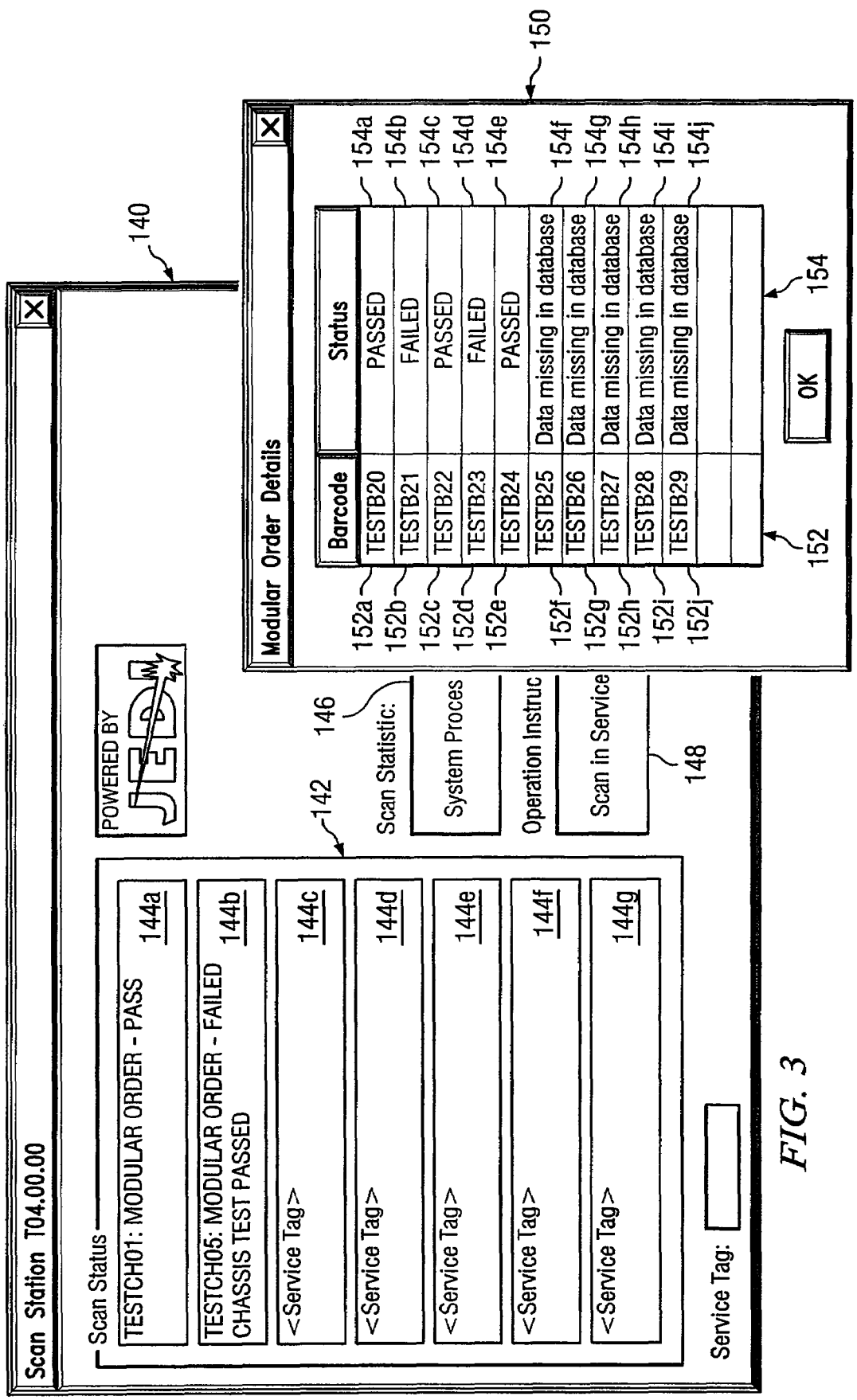
FIG. 3 illustrates an example response dialogue screen including information generated by the installation software validation module according to the teachings of the present invention.

FIG. 3 illustrates another example of a response dialogue screen 140 including information displayed by dialogue module 32 of installation software validation module 30. In this embodiment, two chassis have been scanned and are listed on entries 144a and 144b of scan status box 142. On entry 144a, test chassis 1, "TESTCH01" represents a modular information handling system that has successfully passed software installation verification by installation software validation module 30. In a preferred embodiment the background of entry 144a may be colored green to represent that the modular information handling system has passed the software validation phase and is ready for shipment. On entry 144b, test chassis 5, "TESTCH05" represents a modular order that has failed its software validation. In this preferred embodiment the background of entry 144b may be colored red to indicate that the modular information handling system has failed in at least one aspect of its software installation.

Response dialogue screen 140 also allows modular order details screen 150 to inform the user of what specific parts of a system passed or failed its validation phase. Modular order details screen 150 shows the individual components of test chassis 5 and whether each component passed. Modular order details screen 150 in the illustrated embodiment includes bar code column 152 with bar code entries 152a-j and status column 154 with status entries 154a-j. Bar code entry 152a and status entry 154a show that test blade 20, "TESTB20" has passed the software validation stage. Bar code entry 152b and status entry 154b show that test blade 21, "TESTB21" has failed the software validation stage. Here the failing message may be in red text to highlight the failure. Bar code entry 152f and 154f display that test blade 25, "TESTB25", has failed because there was "Data missing in database." This message indicates that no flag files were found to confirm the installation of software onto blade 25. Modular order details screen 150 efficiently allows the operator to know if a specific blade has failed.

Figure 4:
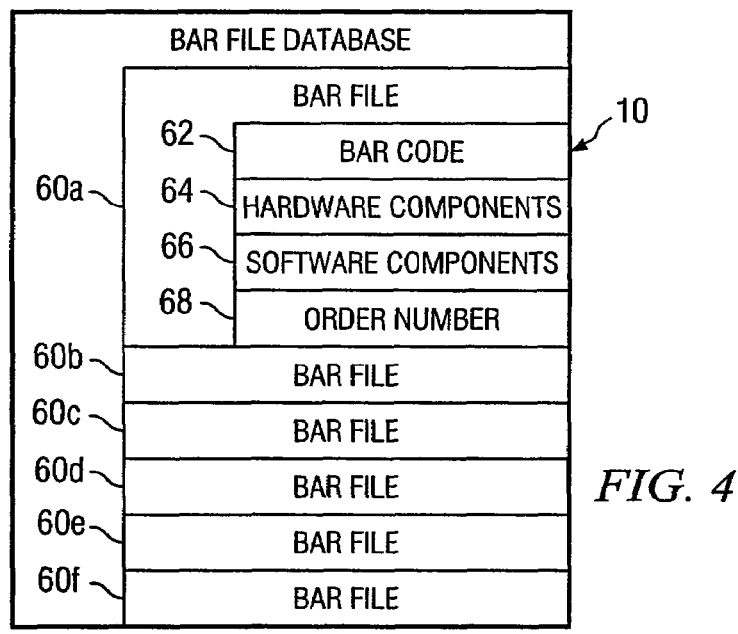
FIG. 4 illustrates a diagram of a bar file database.

FIG. 4 illustrates a diagram of a bar file database. In this embodiment, bar file database 10 stores bar files 60a-60f. Each bar file 60 contains product and order information regarding a component such as a blade 22 or chassis 21 of the modular server 20. For example, bar file 60a comprises information including bar code 62, hardware components 64, software 66 and order number 68 associated with blade 22a. For instance, bar file 60a stores bar code 62, representing a unique identifier assigned to each bar file 60. Bar code 62 associates the blade 22 or chassis 21 to bar file 60a.

In a preferred embodiment, bar file 60 stores lists of hardware components 64 and software 66 necessary of each modular component of modular server 20. Hardware components 64 lists all hardware components necessary to physically construct modular server 20. Software 66 preferably includes a listing of all software applications to be installed on modular server 20.

Bar file 60a may further store order number 68. Order number 68 is associated with modular server 20 and is generated when an order for modular server 20 is initially placed. For that reason, each bar file 60 associated with modular server 20 preferably shares a common order number 68. Further, order number 68 may be used to identify all of the bar files associated with a particular modular information system handling system such as modular server 20.

Figure 5:
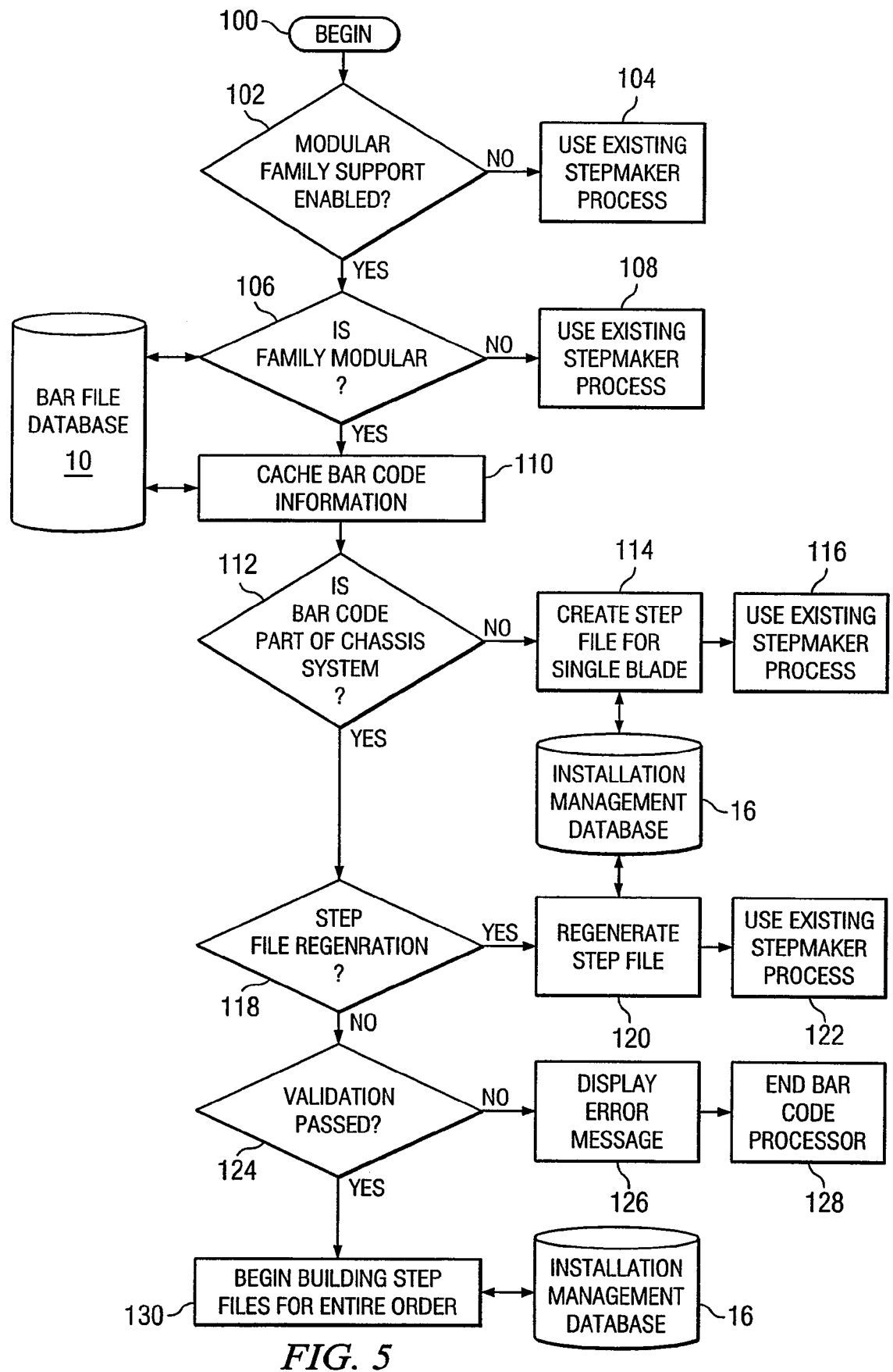
FIG. 5 illustrates a flow chart of a method for automating the installation of software onto information handling systems according to the present disclosure.

FIG. 5 illustrates a flow chart of a method for automating the installation of software onto information handling systems according to the present disclosure. The method begins at step 100, where a bar code 62 associated with a modular component of an information handling system is sent to installation management module 12.

At step 102, the installation management module 12 determines if the information handling system has been enabled as a modular information handling system. This facilitates the deployment of the system in all existing modular and non-modular pre-installation processes.

If the information handling system has not been enabled for modular family support, the method proceeds to step 104 and installation management module 12 performs the pre-installation process using the existing, non-modular stepmaker process. This option provides greater efficiency in software installation by allowing non-modular systems to bypass the additional installation steps necessary for modular systems such as modular server 20.

If the modular family support function is enabled, the method proceeds to step 106. Installation management module 12 accesses bar file database 10 to determine if bar code 62 entered in step 102 belongs to a modular family.

In one embodiment, installation management module 12 accesses bar file database 10 and downloads a list of all modular bar codes and stores them in cache 14. The family name associated with selected modular server families is also preferably stored in cache 14. Then as other bar codes are entered, installation management module 12 performs step 106 by comparing the family of each entered bar code to the stored list of families in cache 14 in order to determine if the bar code belongs to a modular family.

If the bar code does not belong to a modular family, then the method proceeds to step 108, where the existing non-modular stepmaker process is used for pre-installation processing of the information handling system.

If at step 106 installation management module 12 determines that bar code 62 is from a modular family, the method proceeds to step 110. At step 110, installation management module 12 accesses bar file database 10 and identifies each bar file associated with modular server 20 given bar code 62. In one embodiment, the method of identifying each bar file associated with modular server 20 includes providing bar code 62 to bar file database 10. Next installation management module 12 identifies each bar code associated with provided bar code 62 stored in bar file database 10 by finding all bar files with an order number common to the order number associated with bar code 62. Then, installation management module 12 retrieves bar files for the provided bar code and each identified associated bar code from bar file database 10.

In some embodiments, installation management module 12 may store the entire list of bar file information for modular server 20 in cache 14.

Once all bar file information has been identified, the method proceeds to step 112 where installation management module 12 determines if the bar code is part of a chassis system.

If the bar code is determined not to be part of a chassis system, for example if the information handling system is a single blade, the method proceeds to step 114. At step 114, installation management module 12 creates a step file (also referred to as an installation file) listing each installation task required to diagnose selected hardware and to install the selected software onto each modular component of modular server 20. In one embodiment, installation management module 12 may generate a step file by communicating bar file requirements to installation management database 16 and then retrieving a list of installation tasks from installation management database 16.

The method then proceeds to step 116, where the existing non-modular stepmaker process is used for the diagnosis of selected hardware components and the installation of the required software applications onto the information handling system. Although the system is modular, using the existing non-modular stepmaker process may provide efficiencies where a particular information handling system does not have multiple components that require software installation.

If the installation management module 12 determines that the bar code is part of a chassis system at step 112, the method proceeds to step 118. At step 118 installation management module 12 determines if the installation management module 12 should initiate a step file regeneration. A step file regeneration may be needed if one installation task in a step file is known to be corrupt. Therefore, only a single task may need to be re-generated on the step file of modular server 20.

If the bar code has been previously received by installation management module 12, the method proceeds to step 120 where installation management module 12 regenerates the step file. In one embodiment, installation management module 12 regenerates a step file by utilizing the resources of installation management database 16. The method then proceeds to step 122 where the method uses the existing stepmaker process for non-modular servers to diagnose hardware and to install the required software onto the information handling system.

If installation management module 12 in step 118 determines that a step file regeneration is not needed for modular server 20, then the method proceeds to step 124. At step 124, installation management module 12 validates if chassis 21 has any faults. If there is a problem with chassis 21, the method proceeds to step 126. At 126, the method displays an error message regarding the failure of chassis 21 to the operator. Then the method proceeds to step 128 where the method ends.

If at step 124, chassis 21 passes the validation stage, the method proceeds to step 130. At step 130, installation management module 12 begins building step files (installation tasks) for the entire modular order.

The method then proceeds to manage the installation of software onto modular components of modular server 20 using the step files. Installation management module 12 manages hardware diagnosis and installation of software by communicating the step files to software installation module 24. Software installation module 24 is able to install software onto modular server 20 by accessing network 26 such that selected software applications may be installed onto modular server 20.

Although the disclosed embodiments have been described in detail, it should be understood that various changes, substitutions and alterations can be made to the embodiments without departing from their spirit and scope.

What is claimed is:

1. A system for verifying the installation of a plurality of selected software applications onto a selected modular information handling system comprising:
   a bar file database stored in physical storage media including bar files associated with each of a plurality of information handling systems;
   at least one software installation database stored in physical storage media; and
   a software validation module in communication with the at least one software installation database, the software validation module operable to:
      receive a scanned service tag for a selected information handling system including a plurality of blades;
      determine that the selected information handling system including a plurality of blades is a modular information handling system;
      access from the bar file database a bar file including a listing of selected software installation requirements associated with the modular information handling system using the scanned service tag, the selected software installation requirements including software applications for installation on the modular information handling system; and
      query the at least one software installation database to determine whether each software installation requirement for each of the plurality of blades in the modular information handling system has been satisfied.

2. The system of claim 1 wherein the at least one software installation database further comprises a log server associated with a software installation system.

3. The system of claim 2 further comprising the software validation module operable to search the log server for flag files corresponding to completed software installation operations.

4. The system of claim 1 wherein:
   the at least one software installation database further comprises a DPCS database and a log server; and
   the software validation module is further operable to:
      query the DPCS database to determine whether a particular component has completed the steps required for installation; and
      query at least one log server if the DPCS database fails to indicate installation completion.

5. The system of claim 1 wherein the at least one software installation database comprises a database selected from the group consisting of a DPCS database and a BRM database.

6. The system of claim 1 wherein the at least one software installation database further comprises a plurality of databases associated with an installation system.

7. The system of claim 1 wherein the software validation module further comprises a dialogue module operable to generate a response dialogue.

8. A system for verifying the installation of selected software applications onto a modular information handling system, comprising:
   a bar file database stored in physical storage media including bar files associated with each of a plurality of information handling systems;
   a software installation database stored in the physical storage media including data defining whether selected software installation requirements for each of the information handling systems have been satisfied, the selected software installation requirements including software applications for installation on the plurality of information handling systems;
   a software validation module in communication with the bar file database and the software installation database, the software validation module configured to:
      receive a scanned service tag for a particular information handling system including a plurality of blades;
      determine that the particular information handling system including the plurality of blades is a modular information handling system;
      access from the bar file database a bar file identifying the selected software installation requirements associated with the modular information handling system using the scanned service tag; and
      query the software installation database to determine whether the modular information handling system has successfully passed software installation verification based on whether the selected software installation requirements for each of the plurality of blades in the modular information handling system have been satisfied; and
   a dialogue module configured to display to a user a scan status for the modular information handling system, the scan status identifying (a) the modular information handling system and (b) whether the modular information handling system has successfully passed software installation verification.

9. The system of claim 8, the dialogue module further configured to display to the user a scan statistic identifying statistical information regarding a number of the plurality of information handling systems that have successfully passed software installation verification.

10. The system of claim 8, the dialogue module further configured to display to the user verification details including, for each of a plurality of components of the modular information handling system, (a) a service tag identifying that component and (b) information regarding whether that component passed or failed a software installation verification assessment.

11. The system of claim 8, wherein:
   the software installation database comprises a log of flag files corresponding to completed software installation operations; and
   the software validation module is further configured to query the software installation database to determine whether the modular information handling system has successfully passed software installation verification by searching the log for flag files corresponding to completed software installation operations for the modular information handling system.

12. The system of claim 8, wherein the scanned service tag comprises a bar code, track code, or tag.

13. A method for verifying the installation of selected software applications onto a modular information handling system, comprising:
   receiving a scanned service tag for a particular one of a group of information handling systems at a software validation module, the particular information handling system including a plurality of blades;

determining that the particular information handling system including the plurality of blades is a modular information handling system;

accessing from a bar file database stored in physical storage media a bar file identifying selected software installation requirements associated with the modular information handling system using the scanned service tag, the selected software installation requirements including software applications for installation on the modular information handling system;

querying a software installation database stored in the physical storage media to determine whether the selected software installation requirements for each of the plurality of blades in the modular information handling system have been satisfied;

determining whether the modular information handling system has successfully passed software installation verification based on whether the selected software installation requirements for each of the plurality of blades in the modular information handling system have been satisfied; and displaying to a user a scan status for the modular information handling system, the scan status identifying (a) the modular information handling system and (b) whether the modular information handling system has successfully passed software installation verification.

14. The method of claim 13, further comprising simultaneously displaying to the user a scan status for a plurality of the information handling systems, the scan status identifying (a) each of the plurality of information handling systems and (b) whether each of the plurality of information handling systems has successfully passed software installation verification.

15. The method of claim 13, further comprising displaying to the user a scan statistic identifying statistical information regarding a number of the information handling systems that have successfully passed software installation verification.

16. The method of claim 13, further comprising displaying to the user verification details including, for each of a plurality of components of the modular information handling system, (a) a service tag identifying that component and (b) information regarding whether that component passed or failed a software installation verification assessment.

17. The method of claim 13, wherein querying the software installation database to determine whether the selected software installation requirements for the modular information handling system have been satisfied comprises searching a log for flag files corresponding to completed software installation operations.

18. The method of claim 13, wherein the scanned service tag comprises a bar code, track code, or tag.

19. The method of claim 13, wherein the displayed scan status for the modular information handling system is automatically color-coded based on whether the modular information handling system has successfully passed software installation verification.

* * * * *